United States Patent [19]

Koyanagi et al.

[11] Patent Number: 5,604,913
[45] Date of Patent: Feb. 18, 1997

[54] VECTOR PROCESSOR HAVING A MASK REGISTER USED FOR PERFORMING NESTED CONDITIONAL INSTRUCTIONS

[75] Inventors: Yoichi Koyanagi; Takeshi Horie, both of Kawasaki, Japan

[73] Assignee: Fujitsu Limited, Kawasaki, Japan

[21] Appl. No.: 237,305

[22] Filed: May 3, 1994

[30]    Foreign Application Priority Data

Aug. 10, 1993   [JP]   Japan ................................. 5-198416

[51] Int. Cl.$^6$ .................................................. G06F 15/347
[52] U.S. Cl. ......................... 395/800; 395/563; 395/441;
                395/869; 395/870; 364/931.51; 364/931.52;
                                364/947; 364/947.2
[58] Field of Search ............................ 395/800, 375,
                395/441, 869, 870; 364/DIG. 1, 931.51,
                                931.52, 947, 947.2, 947.4

[56]              References Cited

U.S. PATENT DOCUMENTS

| | | | |
|---|---|---|---|
| 4,435,758 | 3/1984 | Lorie et al. ............................. | 395/800 |
| 4,471,433 | 9/1994 | Matsumoto et al. .................... | 395/375 |
| 5,111,388 | 5/1992 | Shiraishi ................................. | 395/800 |
| 5,187,796 | 2/1993 | Wang et al. ............................ | 395/800 |
| 5,274,821 | 12/1993 | Rouquie ................................. | 395/700 |
| 5,371,862 | 12/1994 | Suzuki et al. .......................... | 395/375 |

Primary Examiner—Alyssa H. Bowler
Assistant Examiner—Dzung Nguyen
Attorney, Agent, or Firm—Staas & Halsey

[57]              ABSTRACT

In a computer equipped with a mask register in which is stored mask data indicating, for each array element, whether or not a statement such as an IF statement or an ELSE statement should be applied, the computer having a vector processor executing vector operation processing according to the mask data stored in the mask register, a first executing unit acquires first and second memory areas in which the mask data is saved in a stack formation. A second executing unit generates, when an IF statement appears in execution of a program, mask data indicating truth/falsity of a conditional expression of the IF statement, and saves the mask data indicating the truth/falsity of the conditional expression in the first memory area. A third executing unit reads latest mask data saved in the second memory area in synchronism with a process of the second executing unit. A fourth executing unit performs a bit-base logic operation on the mask data saved by the second executing unit and the mask data read by the third executing unit, stores mask data thus generated and applied to the IF statement in the mask register, and saves the above mask data applied to the above IF statement in the second memory area.

7 Claims, 17 Drawing Sheets

```
for (i=1; i<=N; i=i+1) {
    if (A[i] > 0) {
        C[i] = A[i] + B[i];
    }
}
```

FIG.3 PRIOR ART

```
for (i=1; i<=N; i=i+1) {
    if (A[i] > 0) {
        C[i] = A[i] + B[i];
    } else {
        C[i] = A[i] + D[i];
    }
}
```

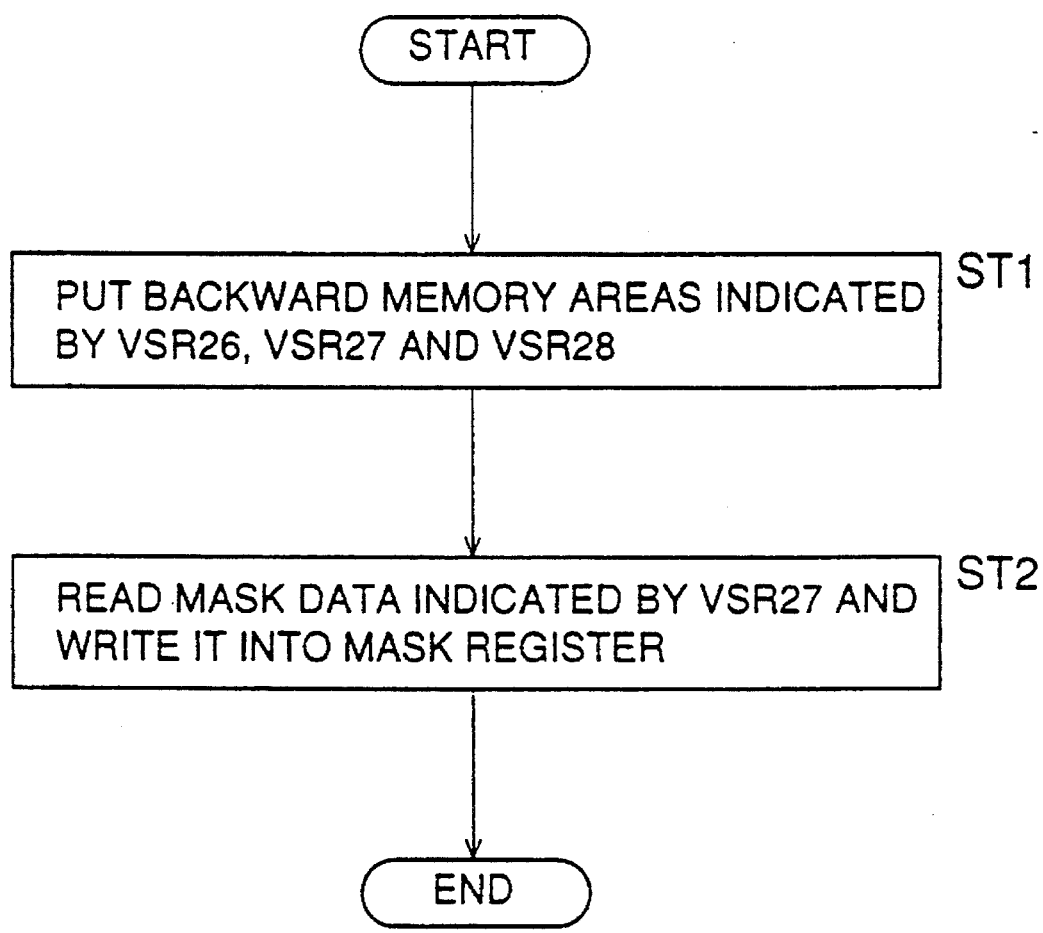

FIG.11

```
for (i=1; i<=N; i=i+1) {

PROCESS L1 if (CONDITIONAL EXPRESSION x) {

PROCESS L2 if (CONDITIONAL EXPRESSION y) {

PROCESS L3

}

PROCESS L4

```
for (i=1; i<=N; i=i+1) {

PROCESS L1 if (CONDITIONAL EXPRESSION x) {

PROCESS L2

} else {

PROCESS L3

}

PROCESS L4

}
```

VECTOR PROCESSOR HAVING A MASK REGISTER USED FOR PERFORMING NESTED CONDITIONAL INSTRUCTIONS

BACKGROUND OF THE INVENTION

1. Field of the Invention

The present invention generally relates to a computer with a vector processor having a masking function, in which there are provided mask registers storing mask data indicating, in the array element unit, whether or not an IF/ELSE statement specified in a program should be applied and vector operation processing is controlled on the basis of the mask data stored in the mask registers. More particularly, the present invention is concerned with a computer with a vector processor having a masking function capable of executing vector operation processing according to the mask data with respect to a program having the structure of IF/ELSE statements which are nested with the level of nesting less than the number of mask registers.

A computer with a vector processor having the masking function is designed to efficiently process the operation of an IF/ELSE statement in a program in a pipeline manner. For example, the computer is equipped with mask registers storing mask data indicating, in the array element unit, whether or not the IF/ELSE statement should be applied. The vector operation is executed by means of the masking function using the mask data. That is, an operation on the array elements indicated by the mask data so that the IF/ELSE statement should be applied to these array elements is validated.

Computers with the vector processors having the masking function as described above are required to have a structure enabling the masking function even if IF/ELSE statements are nested.

2. Description of the Prior Art

As described above, a computer with a vector processor having the masking function performs the vector operation utilizing the masking function which allows execution of an operation on the array elements indicated by the mask data so that an IF/ELSE statement may be applied thereto, the mask data stored in the mask register indicating, in the array element unit, whether or not the IF/ELSE statement should be applied.

A program having an IF statement shown in FIG. 1 will now be considered. FIG. 2 shows processing of a vector operation with the masking function carried out when the program shown in FIG. 1 is executed. FIG. 2 shows a vector register VR storing array elements of vector data A indicating a positive value, and another vector register VR storing array elements of vector data B. A mask register MR has storage areas (entry positions corresponding to the storage areas of the vector registers VR). True values "0" of mask data, indicating that the IF statement should be applied to array elements of vector data A, or false values "1" of mask data indicating that the IF statement should not be applied to array elements of vector data A, are written into the entry positions of the mask register MR. Regarding the array elements of vector data A indicated as the true values by the mask data stored in the mask register MR, vector addition operations on these array elements of vector data A and corresponding array elements of vector data B are executed, and the resultant array elements are written, as vector data C, into the vector register VR.

In the example shown in FIG. 2, the addition operation on array elements A(1) and B(1) is executed and resultant vector data C(1) is written into the vector register VR. Similarly, the addition operation on array elements A(3) and B(3) is executed and resultant vector data C(3) is written into the vector register VR.

FIG. 3 shows a program having an ELSE statement. The mask data indicating whether or not the ELSE statement should be applied is the inverted version of the mask data for the IF statement related to the above ELSE statement.

Generally, in order to cope with IF/ELSE statements which are nested, conventional computers with vector processors having the masking function 10 are designed to have more mask registers than the level of nesting. However, a limited number of mask registers can be provided due to the scale of hardware.

In the prior art, if nesting of IF/ELSE statements having a level greater than the number of mask registers takes place, the mask registers cannot be used. In this case, the use of the vector processor is abandoned and the related program must be performed by a scaler operation. This means that the capability of the high-speed pipelines achieved by the vector processor cannot be utilized and the operation cannot be executed at high speeds.

SUMMARY OF THE INVENTION

It is a general object of the present invention to provide a computer with a vector processor having the masking function in which the above disadvantages are eliminated.

A more specific object of the present invention is to provide a computer with a vector processor having the masking function capable of executing vector operation processing according to mask data stored in mask registers even when a program is processed in which IF/ELSE statements are nested with a level greater than the number of mask registers.

The above objects of the present invention are achieved by a computer equipped with a mask register containing mask data indicating, for each array element, whether or not a statement such as an IF statement or an ELSE statement should be applied, the computer having a vector processor executing vector operation processing according to the mask data stored in the mask register, the computer comprising:

first executing means for acquiring first and second memory areas in which the mask data is saved in a stack formation;

second executing means for generating, when an IF statement appears in execution of a program, mask data indicating a truth/falsity of a conditional expression of the IF statement and for saving the mask data indicating the truth/falsity of the conditional expression in the first memory area;

third executing means for reading latest mask data saved in the second memory area in synchronism with a process of the second executing means; and fourth executing means for performing a bitwise logic operation on the mask data saved by the second executing means and the mask data read by the third executing means, storing mask data thus generated and applied to the IF statement in the mask register and saving the mask data applied to the IF statement in the second memory area.

BRIEF DESCRIPTION OF THE DRAWINGS

Other objects, features and advantages of the present invention will become more apparent from the following detailed description when read in conjunction with the accompanying drawings, in which:

FIG. 3 is a diagram showing a program having an IF/ELSE statement;

FIG. 9 is a flowchart of a process executed by an end-of-IF statement processing routine according to the embodiment of the present invention;

FIG. 11 is a diagram of a program description of the data processsing program;

FIGS. 14A, 14B and 1 are diagrams showing the process of executing the data processing program shown in FIG. 11;

FIG. 15 is a diagram of another program description of the data processing program;

FIGS. 16A and 1 are diagrams showing the process of executing the data processing program shown in FIG. 15;

DESCRIPTION OF THE PREFERRED EMBODIMENT

Figures 1, 2:
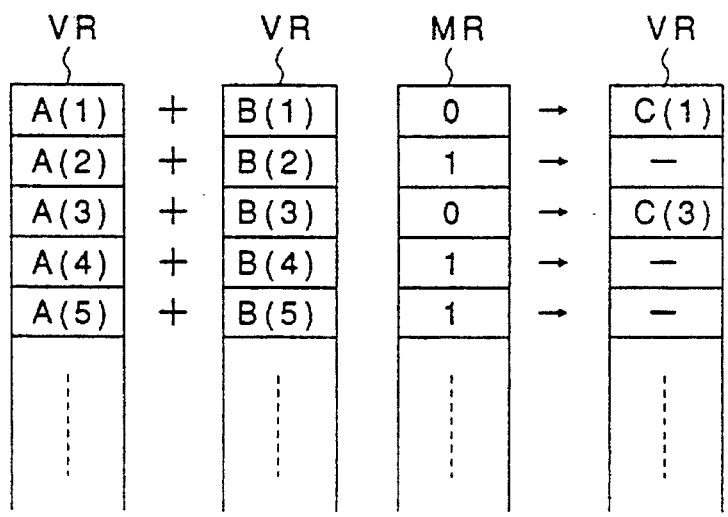
FIG. 1 is a diagram showing a program having an IF statement.
FIG. 2 is a diagram showing vector operation processing utilizing a masking function.
Figure 4:
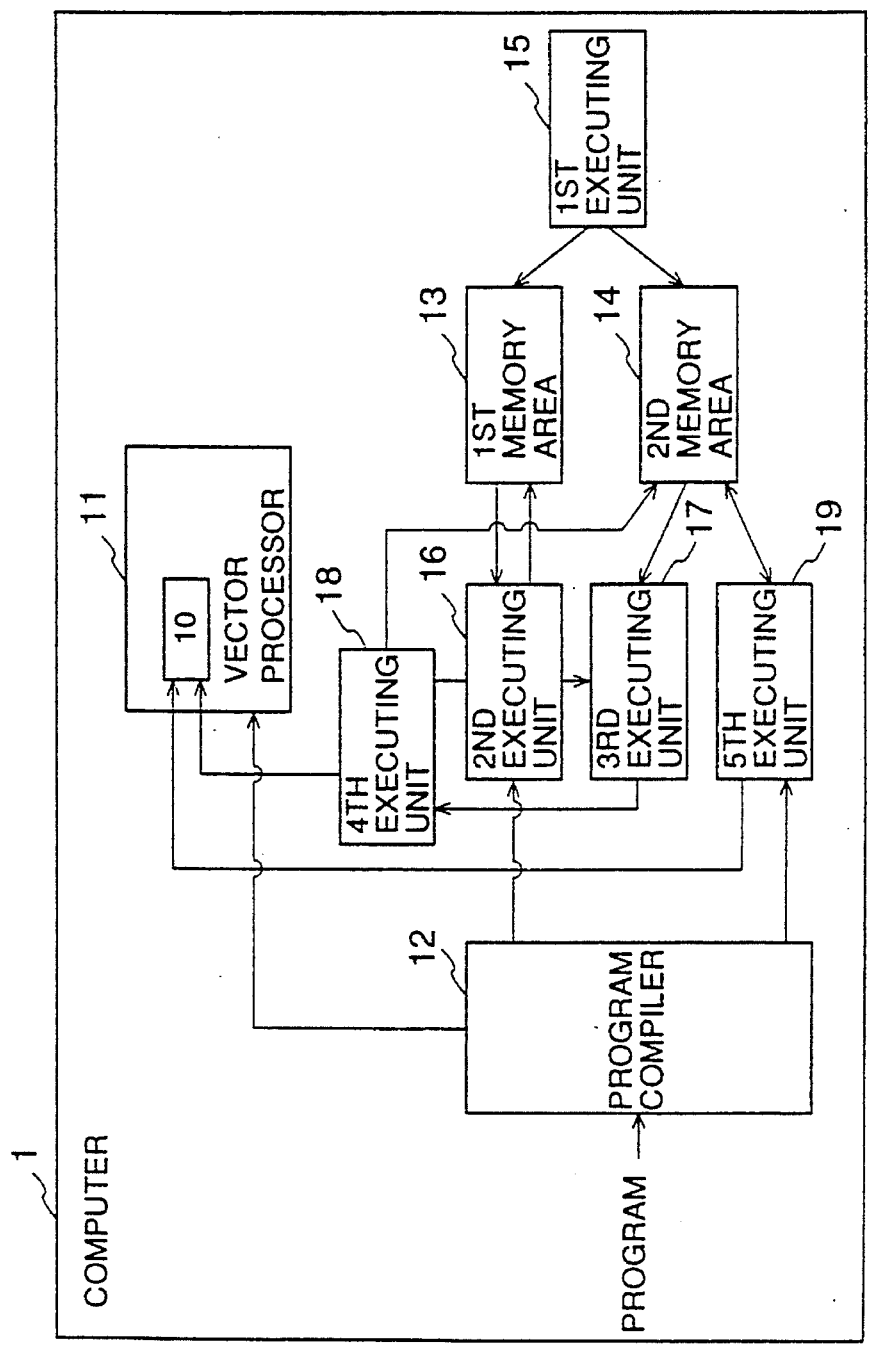
FIG. 4 is a block diagram of the principle of the present invention.

FIG. 4 is a block diagram of the principle of the present invention. A computer 1 shown in FIG. 4 includes a vector processor 11 equipped with a mask register 10, a program compiler 12, a first memory area 13, a second memory area 14, a first executing unit 15, a second executing unit 16, a third executing unit 17, a fourth executing unit 18 and a fifth executing unit 19.

The mask register 10 stores mask data indicating, for each array element, whether or not an IF/ELSE statement specified in a program should be applied. The vector processor 11 executes vector operation processing according to the indication of the mask data stored in the mask register 10. The program compiler 12 compiles a program to be executed. The first memory area 13 is used to save mask data indicating the truth or falsity of a conditional expression of the IF statement described in the program. The second memory area 14 is used to save mask data, which is the object to be stored in the mask register 10 in a stack formation.

The first executing unit 15 acquires the first memory area 13 and the second memory area 14. The second executing unit 16 generates mask data which is the object to be saved in the first memory area 13 and saves the mask data therein. Further, the second executing unit 16 reads the latest mask data saved in the first memory area 13 and executes a bit-base (bitwise) inverting operation of the latest mask data. The third executing unit 17 reads the latest mask data saved in the second memory area 14 in synchronism with the process of the second executing unit 16. The fourth executing unit 18 generates mask data which is the object to be stored in the mask register 10 and stores it therein. Further, the fourth executing unit 18 saves the generated mask data in the second memory area 14. The fifth executing unit 19 updates the mask data saved in the second memory area 14 and stores the latest mask data in the mask register 10.

When an IF statement appears in the program being executed, the second executing unit 16 generates mask data indicating the truth or falsity of the conditional expression of the IF statement, and saves the mask data in the first memory area 13. The third executing unit 17 reads the latest mask data saved in the second memory area 14.

The fourth executing unit 18 executes a bit-base logical operation on the mask data saved by the second executing unit 16 and the mask data read by the third executing means 17, and generates mask data for the array element having the true value only when both the mask data coincide with each other. Then, the fourth executing unit 18 stores the generated mask data in the mask register 10 and saves it in the second memory area 14. That is, by executing the bit-base logical operation on the mask data saved in the second executing unit 16 and the mask data read by the third executing unit 17, the mask data indicating whether or not the IF statement in the nested structure should be applied is generated and stored in the mask register 10 and is saved in the second memory area 14.

When an ELSE statement appears in the program being executed, the second executing unit 16 reads the latest mask data saved in the first memory area 13, and performs a bit-base inverting operation on the read latest mask data, whereby mask data having the inverse truth/falsity relationship is generated. The third executing unit 17 reads the latest mask data saved in the second memory 14.

The fourth executing unit 18 performs a bit-base logical operation on the inverted mask data generated by the second executing unit 16 and the mask data read by the third executing unit 17, and generates mask data having the value true for the array element only when the compared mask data coincide with each other. Then, the fourth executing unit 18 stores the generated mask data in the mask register 10 and saves it in the second memory area 14. That is, by executing the bit-base logical operation on the inverted mask data read by the second executing unit 16 and the mask data read by the third executing unit 17, the mask data indicating whether or not the ELSE statement in the nested structure should be applied is generated and stored in the mask register 10 and is saved in the second memory area 14.

In the above-mentioned manner, the mask data indicating the truth or falsity of the conditional expression in the IF statement appearing during execution of the program is stored in the appearance order, and the mask data indicating whether or not each IF/ELSE statement appearing in the execution of the program should be applied is stored in the second memory area 14 in the appearance order.

When the end-of-IF statement appears in the execution of the program, the fifth executing unit 19 sets the mask data immediately precedent to the latest mask data saved in the second memory area 14 to the latest mask data, and stores the above newly set latest mask data in the mask register 10. That is, the mask data is returned to the state immediately before the end-of-IF statement is executed.

With the above structure, even if there is only one mask register 10, mask data indicating whether or not IF statements and ELSE statements which are nested should be applied can be correctly generated and written into the mask register 10. Hence, it becomes possible to execute vector operation processing for a program having nested IF/ELSE statements according to the mask data.

Figure 5:
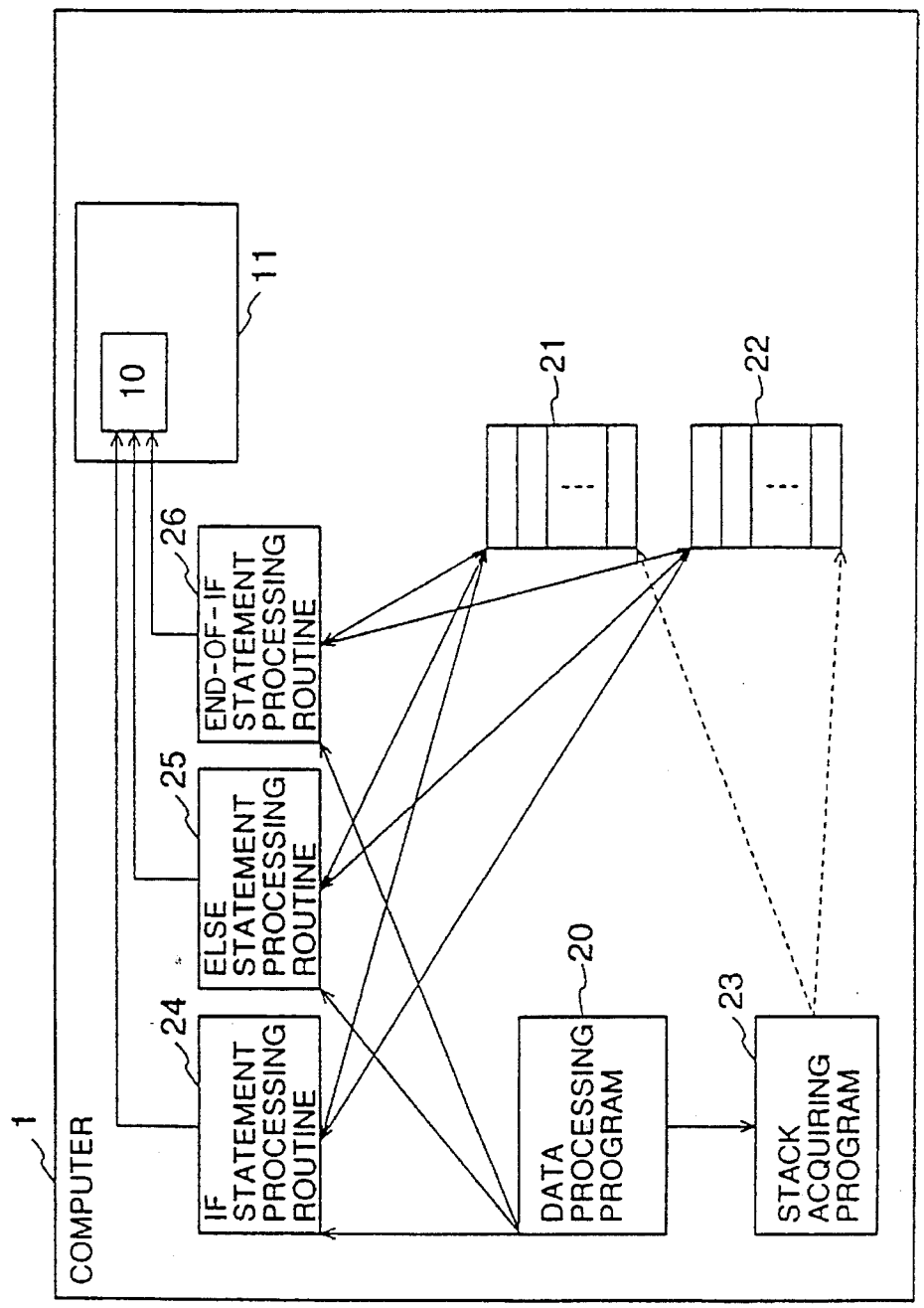
FIG. 5 is a block diagram of the system structure of a computer according to an embodiment of the present invention.

FIG. 5 is block diagram of the system structure of the computer 1 according to an embodiment of the present invention. In FIG. 5, parts that are the same as those shown in the previously described figures are given the same reference numerals as previously.

A data processing program 20 of the computer 1 executes data processing according to a program description containing an IF statement, an ELSE statement and an end-of-IF statement. A first stack 21 is used to save, in a stack formation, mask data indicating the truth/falsity of the conditional expression of each IF statement described in the data processing program 20. A second stack 22 is used to save, in the stack formation, mask data which is the object to be stored in the mask register 10.

A stack acquiring (allocating) program 23 is called from the data processing program 20 and functions to acquire the first stack 21 and the second stack 22. For example, the stack acquiring program 23 is called at the same time as the data processing program 20 is initiated and acquires the first stack 21 and the second stack 22. An IF statement processing routine 24 is called from the data processing program 20 when an IF statement appears in execution of the data processing program 20, and executes a predetermined routine. An ELSE statement processing routine 25 is called from the data processing program 20 when an ELSE statement appears in execution of the data processing program 20, and executes a predetermined routine. An end-of-IF processing routine 26 is called from the data processing program 20 when an end-of-IF statement appears in execution of the data processing program 20, and performs a predetermined routine.

Figure 6A:
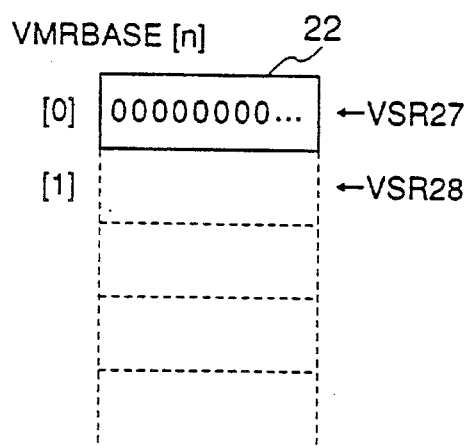
FIGS. 6A and 6B are diagrams of the memory structures of first and second stacks shown in FIG. 5.
Figure 6B:
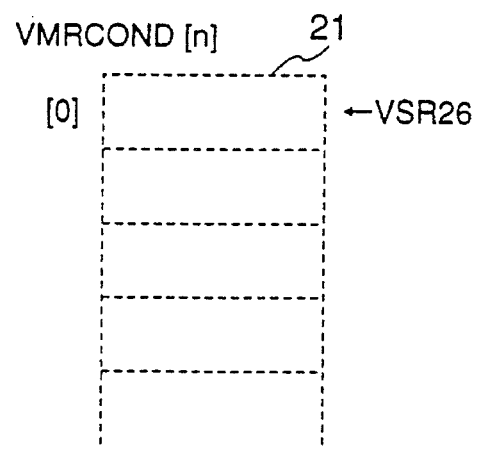

FIG. 6A shows the memory structure of the second stack 22, and FIG. 6B shows the memory structure of the first stack 21. The first stack 21 indicated as "VRAMCOND" is configured to have a pointer "VSR26" indicating the memory area into which data is to be written. The pointer VSR26 is set so as to indicate the beginning memory area in the initial state. The second stack 22 indicated as "VMR-BASE" is configured so that all bits of the beginning memory area are set to "0" in the initial state and so that the second stack 22 has a pointer "VSR27" indicating the memory area which is the read object and a pointer "VSR28" indicating the memory area which is the write object following the pointer "VSR27". In the initial state, the pointer VSR27 is set so as to indicate the beginning memory area.

Figure 7:
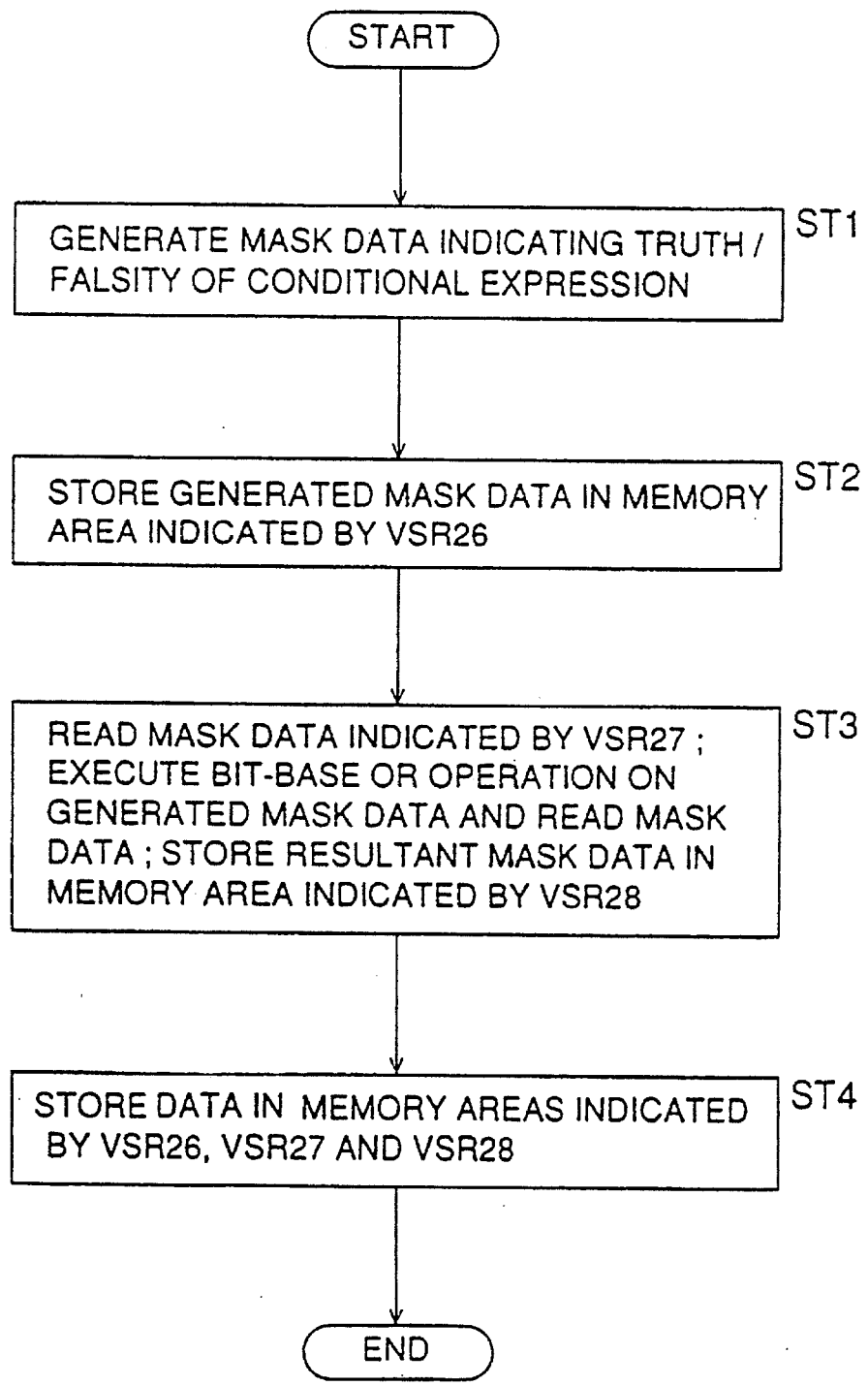
FIG. 7 is a flowchart of a process executed by an IF statement processing routine according to the embodiment of the present invention.
Figure 8:
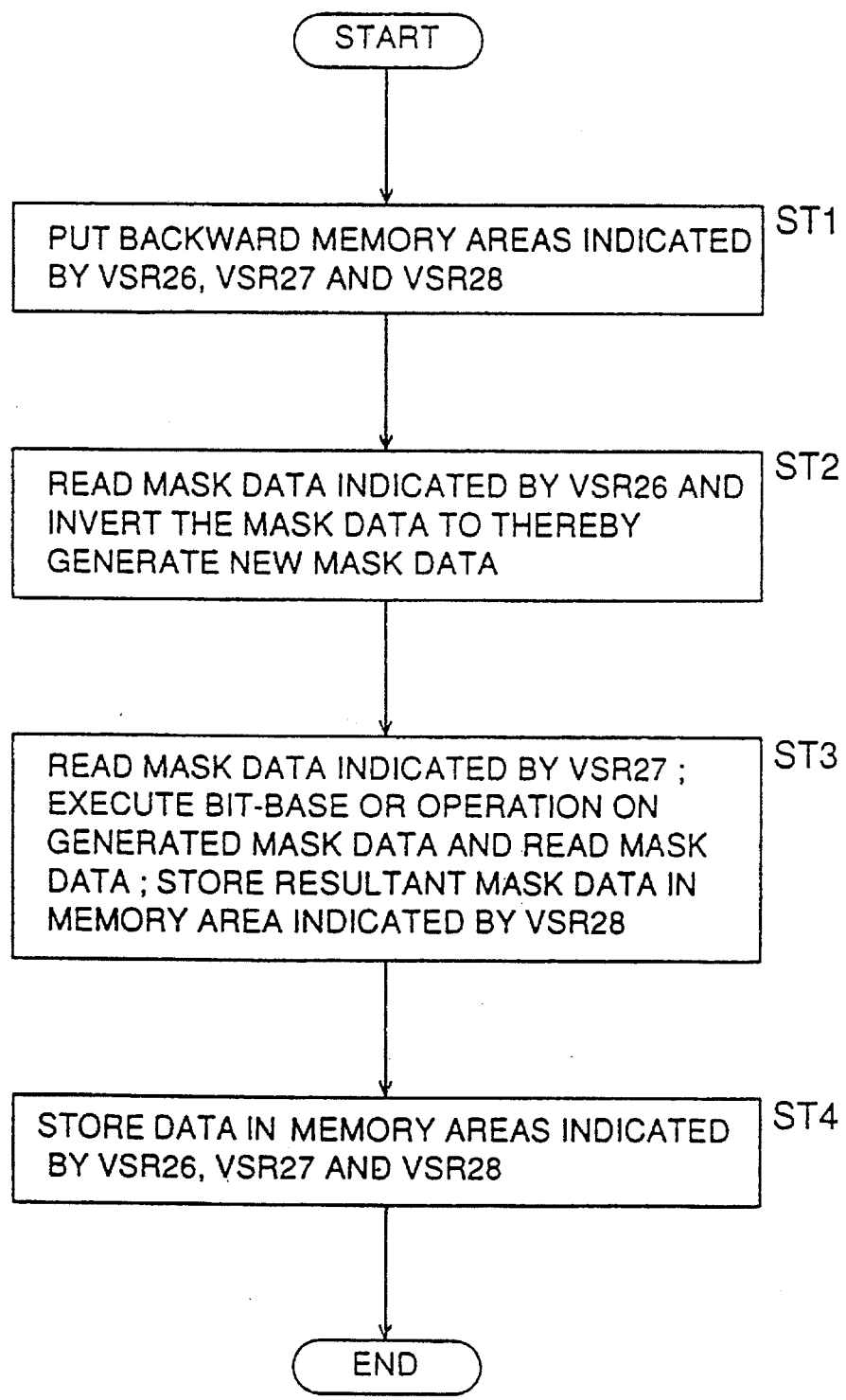
FIG. 8 is a flowchart of a process executed by an ELSE statement processing routine according to the embodiment of the present invention.

FIG. 7 is a flowchart of a process executed by the IF statement processing routine 24. FIG. 8 is a flowchart of a process executed by the ELSE statement processing routine 25. FIG. 9 is a flowchart of a process executed by the end-of-IF statement processing routine 26. A description will now be given, with reference to these figures, of the program executing process according to the embodiment of the present invention.

When an IF statement appears in execution of the data processing program 20, the IF statement processing routine 24 generates mask data indicating the truth/falsity of the above IF statement in step ST1 shown in FIG. 7. In the following description, mask data "1" denotes true and mask data "0" denotes false. In step ST2, the mask data generated in step ST1 is stored in the memory area of the first stack 21 indicated by the pointer VSR26.

In subsequent step ST3, the mask data is read from the memory area of the second stack 22 indicated by the pointer VSR27, and new mask data is generated by executing a bit-base logic OR operation (negative logic AND operation) on the read mask data and the mask data generated in step ST1. The new mask data thus generated is stored in the mask register 10 and is stored in the memory area of the second stack 22 indicated by the pointer VSR28. That is, according to the bit-base OR logic operation, the mask data is generated which indicates the true value for each bit portion in which the true value is indicated by both the mask data and indicates the false value for each bit position in the other cases. The above mask data is set in the mask register 10 and is stored in the second stack 22.

In subsequent step ST4, the pointer values of the pointers VSR26, VSR27 and VSR28 are incremented by one and the process is ended.

Figure 10A:
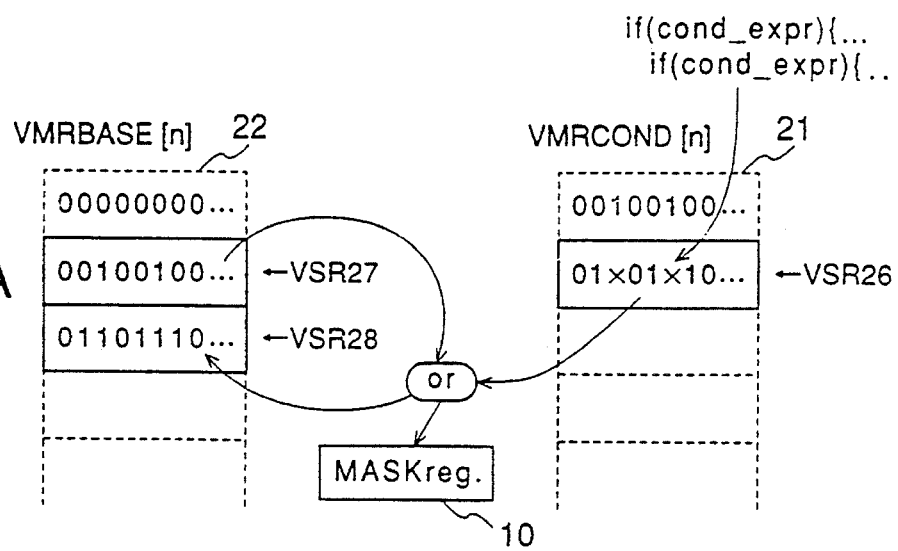
FIGS. 10A, 10B and 10C are diagrams showing the processing routines shown in FIGS. 7, 8 and 9, respectively.

In short, when an IF statement appears, as shown in FIG. 10A, the mask data indicating the truth or falsity of the conditional expression of the above IF statement is generated and stored in the first stack 21. Then, the bit-base OR logic operation on the generated mask data and the latest mask data stored in the second stack 22 is performed, whereby mask data is obtained indicating whether or not the above IF statement in the nested structure should be applied. The above mask data is then stored in the mask register 10 and the second stack 22. In FIG. 10A, "x" occurring in the mask data indicates that the bit is either "0" or "1".

According to the IF statement processing routine 24, the mask data indicating the truth/falsity of the conditional expression of the IF statement appearing in execution of the program is stored in the first stack 21 in the order of appearance. Further, the mask data indicating whether or not the IF statement appearing in execution of the program should be applied is stored in the second stack 22 in the appearance order.

According to the IF statement processing routine 24, when an IF statement appears, the mask data indicating whether or not the IF statement in the nested structure should be applied can be correctly stored in the mask register 10. Hence, the vector processor 11 can execute a vector operation defined subsequent to the IF statement by referring to the mask register 10.

The ELSE statement processing routine 25 shown in FIG. 8 is as follows. When an ELSE statement appears in execution of the data processing program 20, in step ST1 shown in FIG. 8, the pointer values of the pointers VSR26, VSR27 and VSR28 are decremented by one, so that the pointer values thereof which were put forward by one due to the appearance of the IF statement are put backward by one. Hence, the memory areas immediately preceding the memory areas indicated by the pointers VSR26, VSR27 and VSR28 put forward due to the appearance of the IF statement are indicated by these pointers.

In step ST2 shown in FIG. 8, the mask data is read from the memory area of the first stack 21 indicated by the pointer VSR26, and is bitwise logically inverted, whereby new mask data is generated. In subsequent step ST3, the mask data is read from the memory area of the second stack 22 indicated by the pointer VSR27, and the OR logic operation on the read mask data and the inverted mask data generated in step ST1 is executed whereby new mask data is generated. The above new mask data is written into the mask register 10 and the memory area of the second stack 22 indicated by the pointer VSR28. That is, according to the bit-base OR logic operation, the mask data is generated which indicates the true value for each bit position at which the true value is indicated by both the mask data and indicates the false value for each bit position in the other cases. The above mask data is set in the mask register 10 and is stored in the second stack 22.

In subsequent step ST4, the pointer values of the pointers VSR26, VSR27 and VSR28 are incremented by one and then the process shown in FIG. 8 is executed.

Figure 10B:
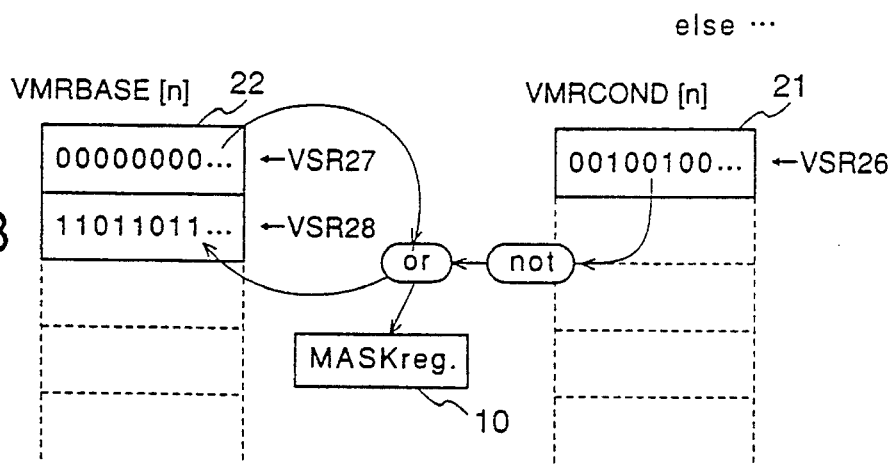

In short, as shown in FIG. 10B, when an ELSE statement appears, the ELSE statement processing routine 25 reads, from the first stack 21, the mask data indicating the truth/falsity of the conditional expression of the IF statement related to the above ELSE statement, and inverts the read mask data bits. The inverted mask data is then stored in the second stack 22. Then, the OR logic operation on the inverted mask data and the latest mask data stored in the second stack 22 is executed, whereby mask data indicating whether or not the ELSE statement in the nested structure should be applied is obtained. The above mask data is then stored in the mask register 10 and the second stack 22.

According to the ELSE statement processing routine 25, the mask data indicating whether or not the ELSE statement should be applied is stored in the second stack 22 in the appearance order. According to the ELSE statement processing routine 25, when an ELSE statement appears, the mask data indicating whether or not the ELSE statement in the nested structure should be applied can be correctly stored in the mask register 10. Hence, the vector processor 11 can execute a vector operation defined subsequent to the ELSE statement by referring to the mask register 10.

The end-of-IF statement processing routine 26 will be described with reference to FIG. 9. When an end-of-IF statement appears in execution of the data processing program 20, in step ST1 the pointer values of the pointers VSR26, VSR27 and VSR28 are put backward (decremented) by one, so that the pointer values put forward by one due to the appearance of the IF statement are put backward by one. Hence, the memory areas immediately preceding the memory areas indicated by the pointers VSR26, VSR27 and VSR28 put forward due to the appearance of the IF statement are indicated by these pointers.

In step ST2, the mask data is read from the memory area of the second stack 22 indicated by the pointer VSR27, and is written into the mask register 10. Then, the process shown in FIG. 9 is ended.

Figure 10C:
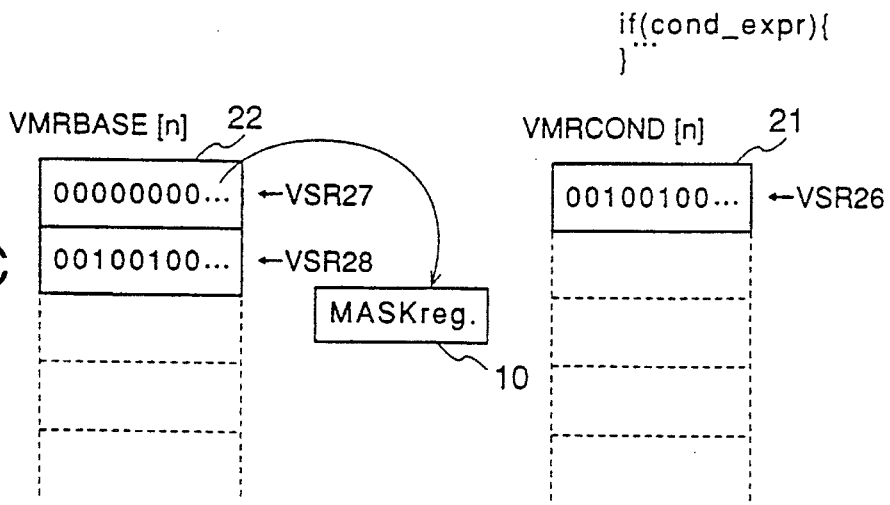

In short, as shown in FIG. 10C, according to the end-of-IF statement processing routine 26, the mask data immediately preceding the last mask data stored in the second stack 22 is set as the latest mask data stored in the second stack 22, and is stored in the mask register 10.

According to the end-of-IF statement processing routine 26, when an end-of-IF statement appears, the mask data is returned to the state immediately before the IF statement is executed.

A description will now be given of a concrete program execution process according to the embodiment of the present invention.

Figure 12A:
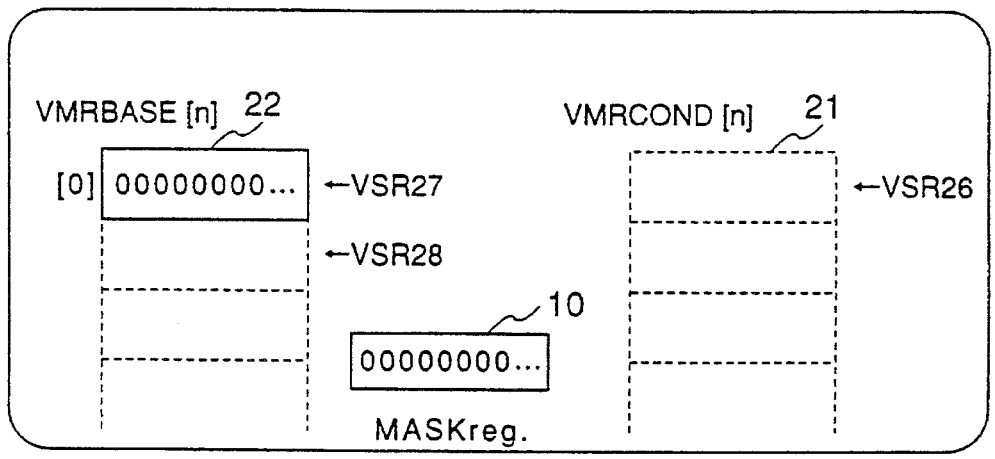
FIGS. 12A and 12B are diagrams showing the process of executing the data processing program shown in FIG. 11.
Figure 12B:
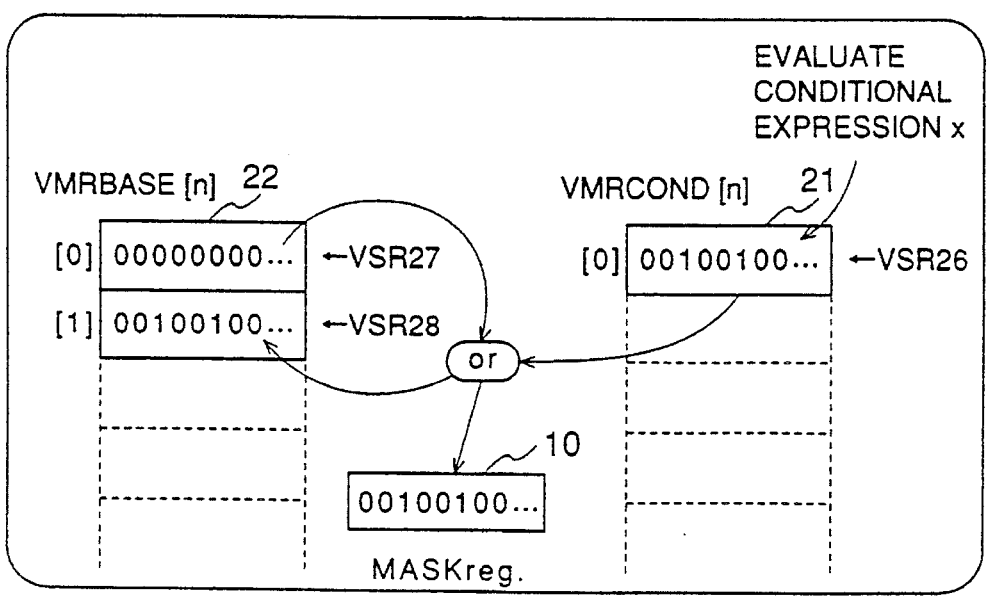
Figure 13A:
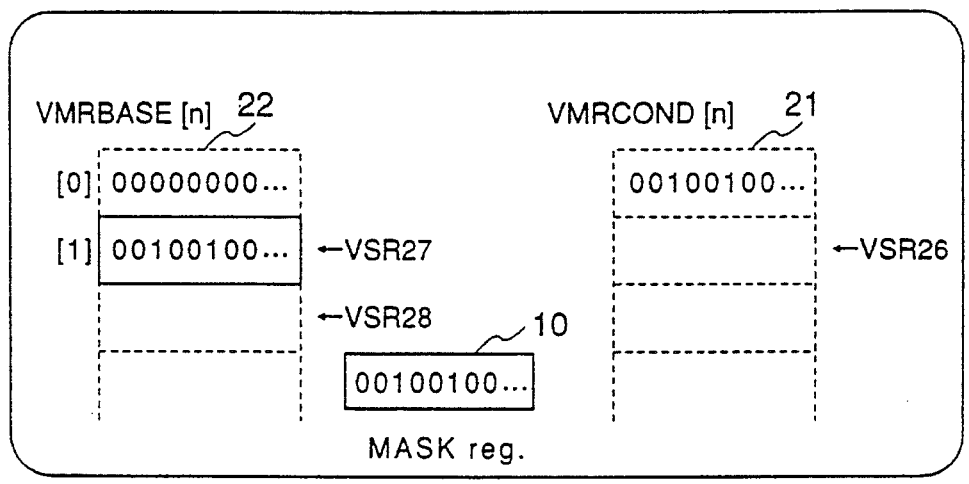
FIGS. 13A and 13B are diagrams showing the process of executing the data processing program shown in FIG. 11.

In a case where the data processing program 20 has a program description shown in FIG. 11, before process L1 is processed, according to the stack allocating program 23, the first stack 21 and the second stack 22 are allocated and initialized, as shown in FIG. 12A. When processing of the process L1 is completed according to the vector process with the masking function, according to the IF statement processing routine 24, as shown in FIG. 12B mask data indicating the truth/falsity of conditional expression x is generated and stored in the first stack 21. Then, mask data is generated by executing the bit-base OR logic operation on the above mask data related to the conditional expression x and mask data having all bits "0" indicated by the pointer VSR27, and is stored in the mask register 10 and the second stack 22. Subsequently, as shown in FIG. 13A, the pointer values of the pointers VSR26, VSR27 and VSR28 are incremented by one.

Figure 13B:
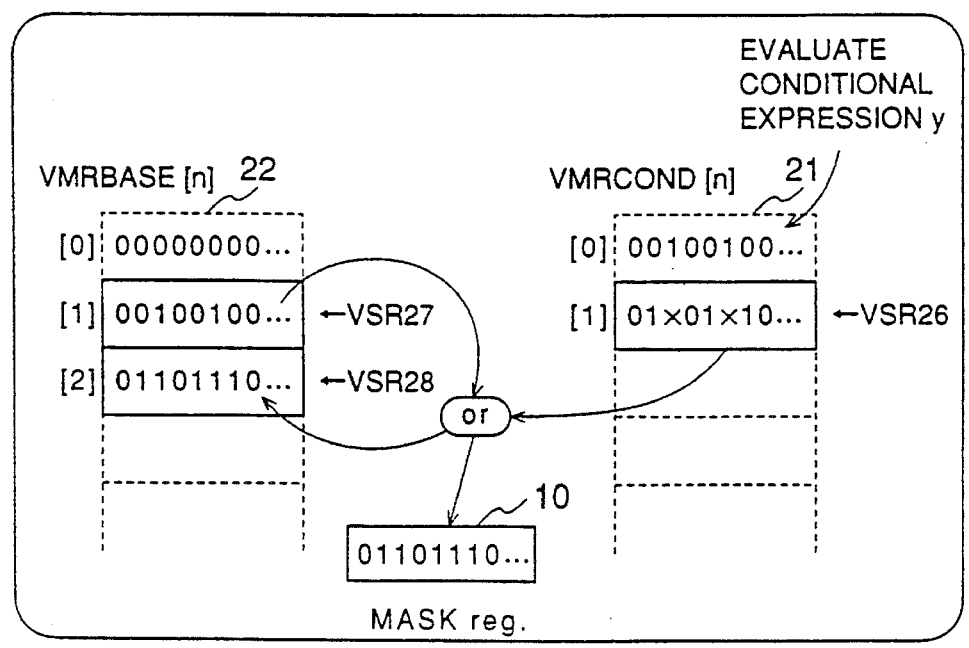
Figure 14A:
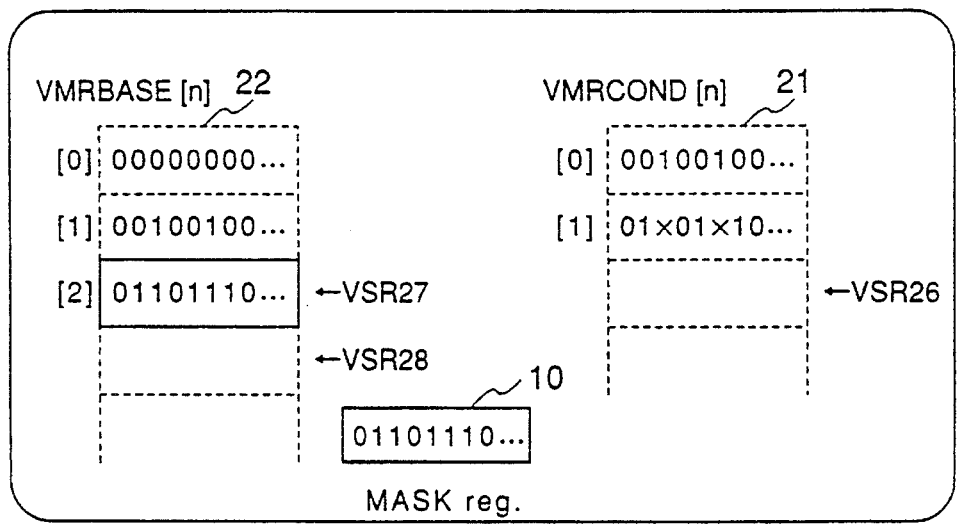

When process L2 is completed according to the vector process with the masking function, subsequently, according to the IF statement processing routine 24, as shown in FIG. 13B mask data indicating the truth/falsity of conditional expression y is generated and stored in the first stack 21. Then, mask data is generated by executing the bit-base OR logic operation on the above mask data related to the conditional expression y and the mask data indicated by the pointer VSR27 (which was written into the mask register the last time), and is stored in the mask register 10 and the second stack 22. Subsequently as shown in FIG. 14A, the pointer values of the pointers VSR26, VSR27 and VSR28 are incremented by one.

Figure 14B:
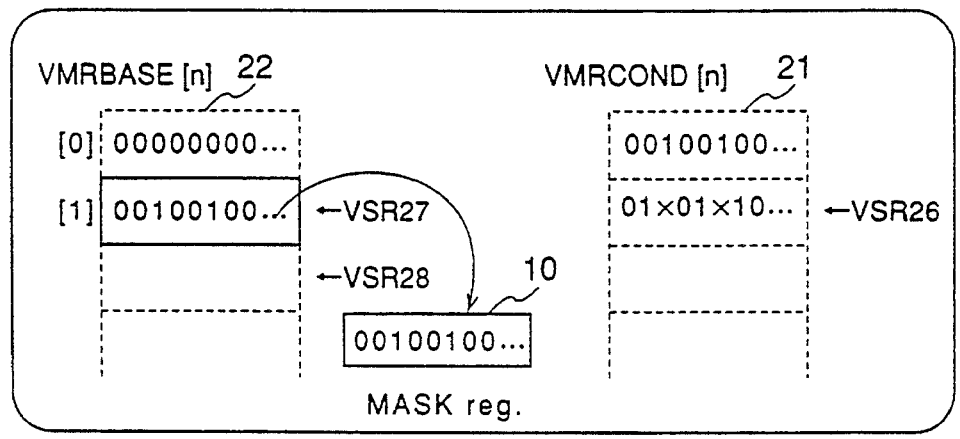

When process L3 is completed according to the vector process with the masking function, subsequently according to the end-of-IF statement processing routine 26, as shown in FIG. 14B, the mask data indicated by the pointer VSR27 which has been put backward by one is read and written into the mask register 10. Hence, the mask data is returned to the state immediately before the IF statement is executed.

Figure 14C:
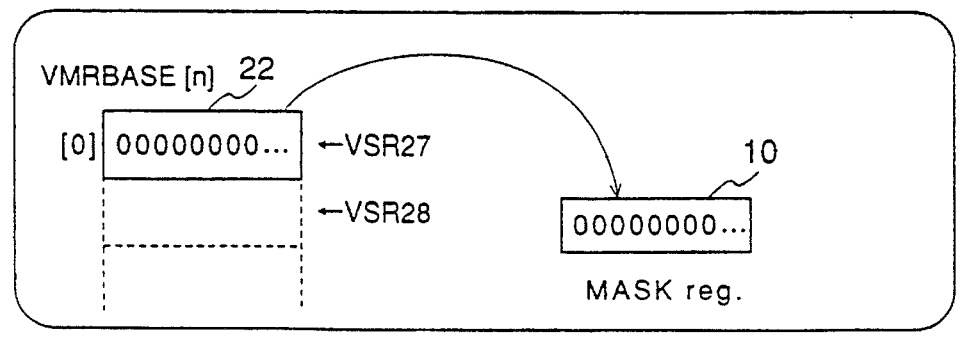

When process L4 is completed according to the vector process with the masking function, subsequently according to the end-of-IF statement processing routine 26, as shown in FIG. 14C, the mask data indicated by the pointer VSR27 which has been put backward by one is read and written into the mask register 10. Hence, the mask data is returned to the state immediately before the first IF statement in program of FIG. 11 is processed, and the process is ended.

Figure 16A:
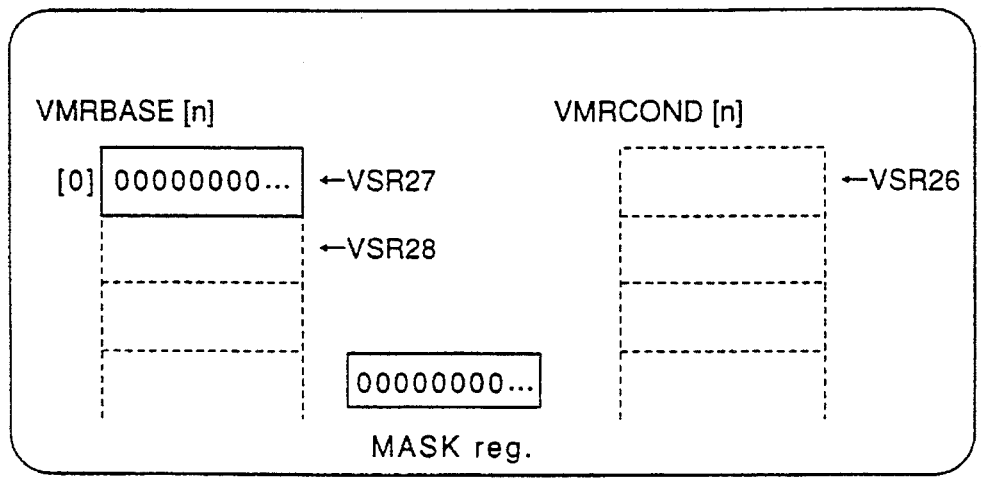

A description will now be given of another program executing process. Assuming that the data process program 20 has a program description shown in FIG. 15, the first stack 21 and the second stack 22 are acquired and initialized before the process L1 is processed according to the stack acquiring program 23, as shown in FIG. 16A.

Figure 16B:
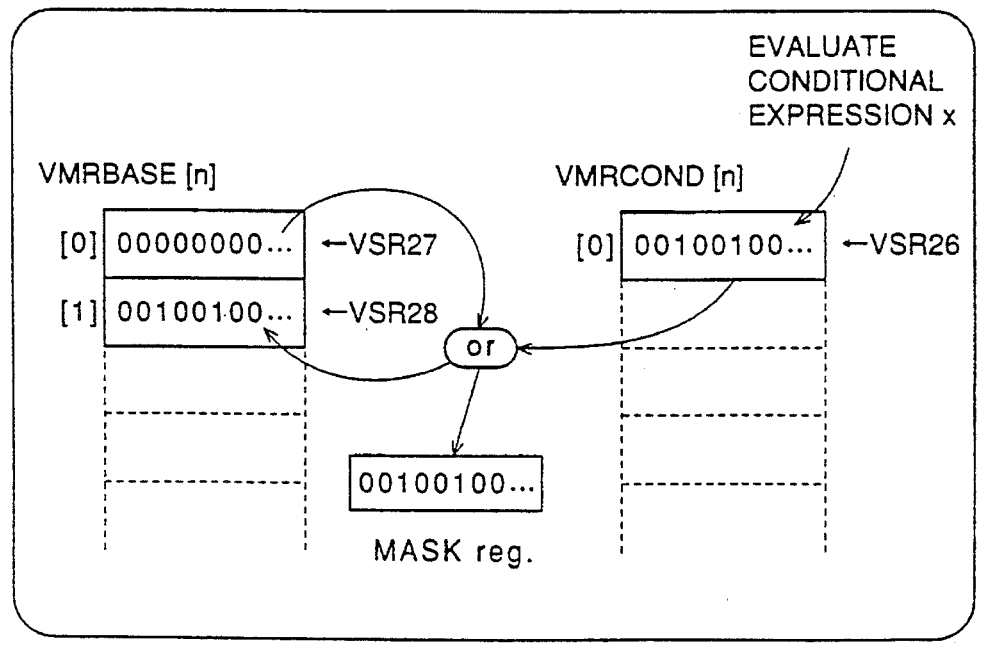
Figure 17A:
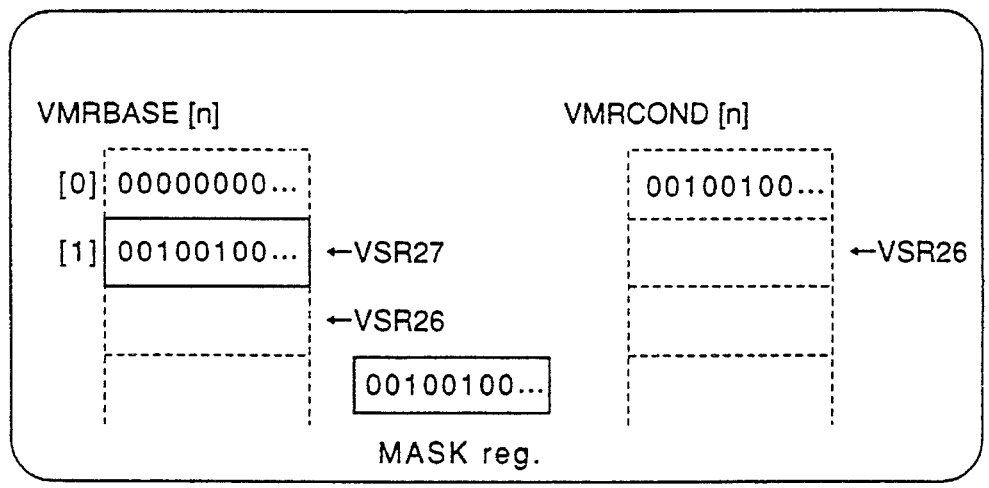
FIGS. 17A and 17B are diagrams showing the process of executing the data processing program shown in FIG. 15.

When processing of the process L1 is completed according to the vector process with the masking function, subsequently according to the IF statement processing routine 24, as shown in FIG. 16B, mask data indicating the truth/falsity of conditional expression x is generated and stored in the first stack 21. Then, mask data is generated by executing the bit-base OR logic operation on the above mask data related to the conditional expression x and mask data having all bits "0" indicated by the pointer VSR27, and is stored in the mask register 10 and the second stack 22. Subsequently, as shown in FIG. 17A, the pointer values of the pointers VSR26, VSR27 and VSR28 are incremented by one.

Figure 17B:
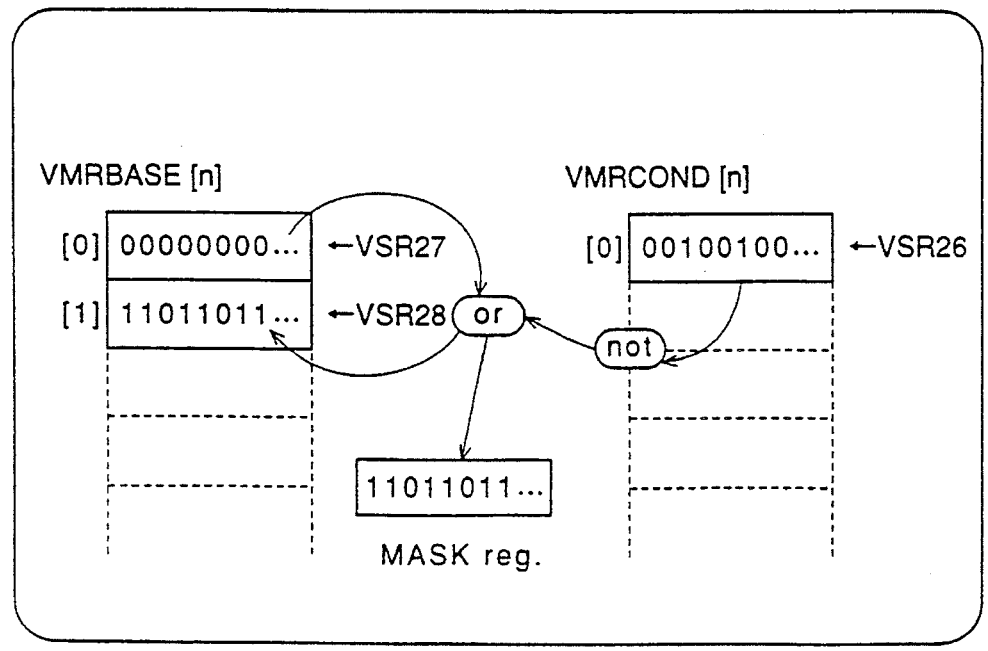
Figure 18A:
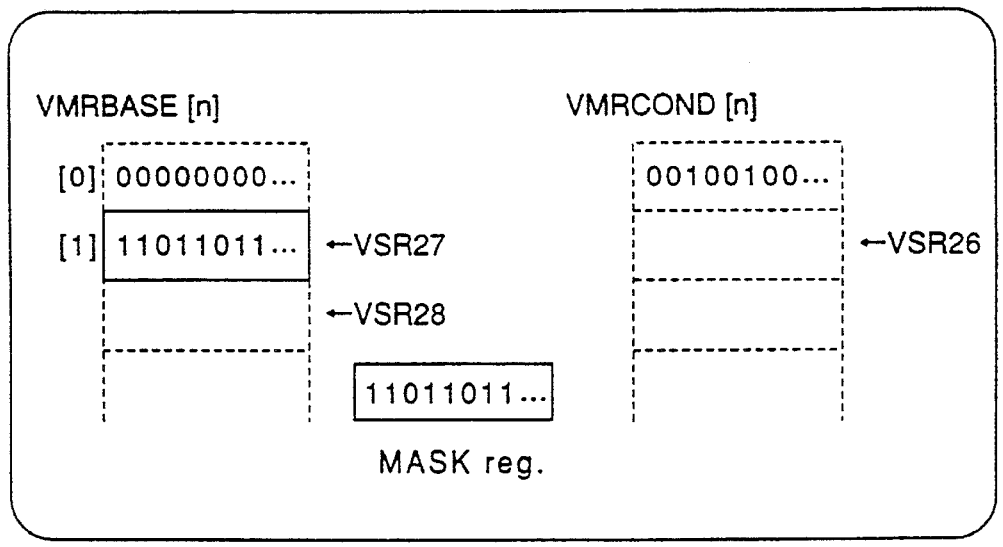
FIGS. 18A and 18B are diagrams showing the process of executing the data processing program shown in FIG. 15.

When process L2 is completed according to the vector process with the masking function, subsequently according to the ELSE statement processing routine 25, as shown in FIG. 17B mask data (which indicates the truth/falsity of the conditional expression x) indicated by the pointer VSR26 is read and bitwise inverted, whereby new mask data is generated. Then, the bit-base OR logic operation on the above inverted mask data and the mask data indicated by the pointer VSR27 (which was written into the mask register the last time) is executed, and the resultant mask data is stored in the mask register 10 and the second stack 22. Subsequently as shown in FIG. 18A, the pointer values of the pointers VSR26, VSR27 and VSR28 are incremented by one.

Figure 18B:
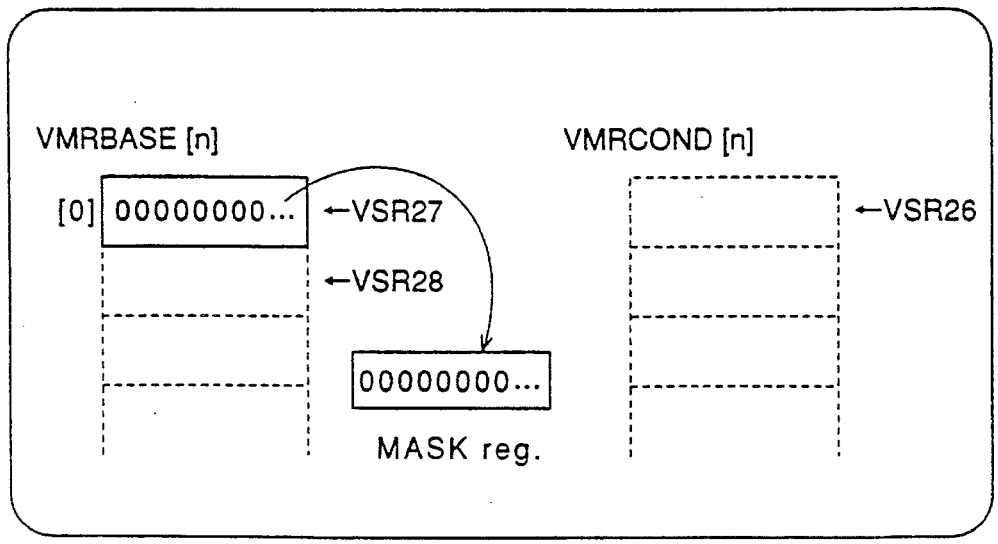

When process L3 is completed according to the vector process with the masking function, subsequently according to the end-of-IF statement processing routine 26, as shown in FIG. 18B, the mask data indicated by the pointer VSR27 which has been put backward by one is read and written into the mask register 10. Hence, the mask data is returned to the state immediately before the end-of-IF statement is executed.

In the above-mentioned manner, according to the IF statement processing routine 24, the ELSE statement processing routine 25 and the end-of-IF processing routine 26, the mask data indicating whether or not IF/ELSE statements in the nested structure should be applied can be correctly written into the mask register 10.

The present invention is not limited to the specifically described embodiment. For example, the present invention is not limited to a computer having a single mask register 10, but includes a computer having a plurality of mask registers. Normally, these mask registers are used in the conventional manner. However, if only one mask register becomes idle while the other mask registers become busy, the above-mentioned process can be initiated.

What is claimed is:

1. A computer, comprising:
   a mask register having array elements, in which mask register is stored operation mask data indicating, for each array element, whether an operation of an IF statement or an operation of an ELSE statement should be implemented; the computer having:
   a vector processor executing vector operation processing according to the operation mask data stored in the mask register;
   first executing means for acquiring first and second memory areas in which mask data is saved in a stack order;
   second executing means for generating, when an IF statement appears in execution of a program, condition indicating mask data indicating truth or falsity of a conditional expression of said IF statement and for saving the condition indicating mask data indicating the truth or falsity of the conditional expression in the first memory area;
   third executing means for reading a latest operation mask data saved in the second memory area in synchronism with the operation by the second executing means; and
   fourth executing means for performing a bit-base logic operation on the condition indicating mask data saved by the second executing means and the latest operation mask data read by the third executing means, storing result data thus generated by the fourth executing means and applied to the operation of the IF statement in the mask register and saving the result data in the second memory area.

2. The computer as claimed in claim 1, wherein:
   the second executing means further comprises means for reading latest mask data saved in the first memory area and generating an inverted version of the latest mask data on a bit base when an operation of an ELSE statement appears in execution of the program; and
   the fourth executing means further comprises means for performing a bit-base logic operation on the inverted version of the latest mask data and the latest operation mask data read by the third executing means, thus generating result mask data to be implemented by the operation of the ELSE statement and saving the result mask data to be implemented by the operation of the ELSE statement in the second memory area.

3. The computer as claimed in claim 1, further comprising fifth means for setting, as new latest result mask data, a result mask data immediately preceding the latest result mask data saved in the second memory area when an end-of-IF statement appears in execution of the program and for storing the new latest result mask data in the mask register.

4. The computer as claimed in claim 2, further comprising fifth means for setting, as new latest result mask data, a result mask data immediately preceding the latest result mask data saved in the second memory area when an end-of-IF statement appears in execution of the program and for storing the new latest result mask data in the mask register.

5. A computer, comprising:
   a mask register having a plurality of array elements each storing operation mask data indicating whether an IF statement or an ELSE statement should be implemented;
   a vector processor for implementing either the IF statement or the ELSE statement in accordance with the operation mask data;
   a stack having a first memory area and a second memory area each with a stack order;
   first executing means for accessing mask data from both the first memory area and the second memory area;
   second executing means for generating condition indicating mask data indicating either a true state or a false state of either the IF statement or the ELSE statement, and for saving the condition indicating mask data into the first memory area in the stack order;
   third executing means for reading a latest operation mask data stored in the stack from the second memory area while the second executing means is generating and saving the condition indicating mask data; and
   fourth executing means for generating result data by performing a bit-base logic operation on the condition indicating mask data and the latest operation mask data, and for saving the result data into the second memory area.

6. A computer, comprising:
   a vector processor having a mask register;
   a stack;
   first means for acquiring execution mask data from the mask register which indicates whether a program conditional statement should be executed;
   second means for generating condition indicating mask data responsive to processing by said vector processor, and for saving the condition indicating mask data into the stack; and
   third means for executing the conditional statement responsive to the condition indicating mask data and the execution mask data.

7. A computer for processing nested conditional vector operations including a nesting end, said computer comprising:

vector registers each including array elements, said registers including data registers, a result register and a mask register, said mask register storing mask data indicating whether a conditional vector operation should be applied for corresponding array elements;

a stack having a stack order; and vector processing means, coupled to said vector registers and said stack, for performing vector operations on the array elements by performing an operation of the conditional vector operations using data from the data register to produce an indicator of whether a condition of the conditional vector operation should be executed, storing the indicator and the mask data in the stack when the conditional vector operation is nested and executing the condition of the stack in the stack order responsive to the indicator and the mask data when the nesting end is encountered and producing a result stored in the result register.

* * * * *

UNITED STATES PATENT AND TRADEMARK OFFICE
CERTIFICATE OF CORRECTION

PATENT NO.  : 5,604,913
DATED       : February 18, 1997
INVENTOR(S) : KOYANAGI et al.

It is certified that error appears in the above-indentified patent and that said Letters Patent is hereby corrected as shown below:

Col. 1, line 57, after "data" insert --,--.
Col. 2, line 11, delete "10".
Col. 2, line 19, "scaler" should be --scalar--.
Col. 3, line 31, "1" should be --14C--.
Col. 3, line 35, "1" should be --16B--.

Signed and Sealed this

Twenty-fourth Day of June, 1997

Attest:

BRUCE LEHMAN

Attesting Officer

Commissioner of Patents and Trademarks